United States Patent
Ryerson

(10) Patent No.: US 9,367,705 B2
(45) Date of Patent: Jun. 14, 2016

(54) METHODS AND SYSTEMS FOR IMPLEMENTING SECURITY POLICIES ON A MOBILE DEVICE

(71) Applicant: BlackBerry Limited, Waterloo (CA)

(72) Inventor: Christopher Maybee Ryerson, Kanata (CA)

(73) Assignee: BlackBerry Limited, Waterloo (CA)

( * ) Notice: Subject to any disclaimer, the term of this patent is extended or adjusted under 35 U.S.C. 154(b) by 114 days.

(21) Appl. No.: 13/656,891

(22) Filed: Oct. 22, 2012

(65) Prior Publication Data

US 2014/0115653 A1    Apr. 24, 2014

(51) Int. Cl.
*G06F 21/62* (2013.01)

(52) U.S. Cl.
CPC ................................. *G06F 21/6245* (2013.01)

(58) Field of Classification Search
CPC ... H04L 63/20; H04L 63/102; H04L 63/0227; G06F 21/6218; G06F 21/604
USPC ............................................................ 726/1
See application file for complete search history.

(56) References Cited

U.S. PATENT DOCUMENTS

| | | | |
|---|---|---|---|
| 2005/0055578 A1 | 3/2005 | Wright et al. | |
| 2006/0120526 A1* | 6/2006 | Boucher et al. | 380/247 |
| 2006/0282876 A1 | 12/2006 | Shelest et al. | |
| 2014/0007222 A1* | 1/2014 | Qureshi et al. | 726/16 |

OTHER PUBLICATIONS

European Patent Office, Extended European Search Report dated Jul. 23, 2013, issued in European Patent Application No. 12189458.8-1957.
The Enterprise Mobility Forum, BlackBerry, "Are you limiting the devices on your personal liable MDM solution?", http://themf.org/groups/individual-vs-corporate-liable-device-strategies/forum/topic/are . . . , Last accessed on Aug. 29, 2012.
Windows Mobile Device Security Model, Windows Mobile 6.5, Apr. 8, 2010, http://msdn.microsoft.com/en-us/library/bb416353(d=printer).aspx, Last accessed on Aug. 29, 2012.
Blackberry, BlackBerry Device Software, Securing Devices for Personal Use and Work use, Version 6.0, Security Note, Published on Oct. 7, 2011.

* cited by examiner

*Primary Examiner* — Baotran N To
(74) *Attorney, Agent, or Firm* — Ridout & Maybee LLP

(57) ABSTRACT

Methods and devices for implementing security policies on a wireless device. The wireless device may include a non-volatile memory comprising a security type hard-coded in the non-volatile memory. Based on the security type, it may be determined whether a received security policy governing behavior of one or more resources designated as personal is applicable to the one or more resources designated as personal. If the security type is determined to indicate that the received security policy is not applicable to the one or more resources designated as personal, the security policy may not be applied to the one or more resources designated as personal.

18 Claims, 6 Drawing Sheets

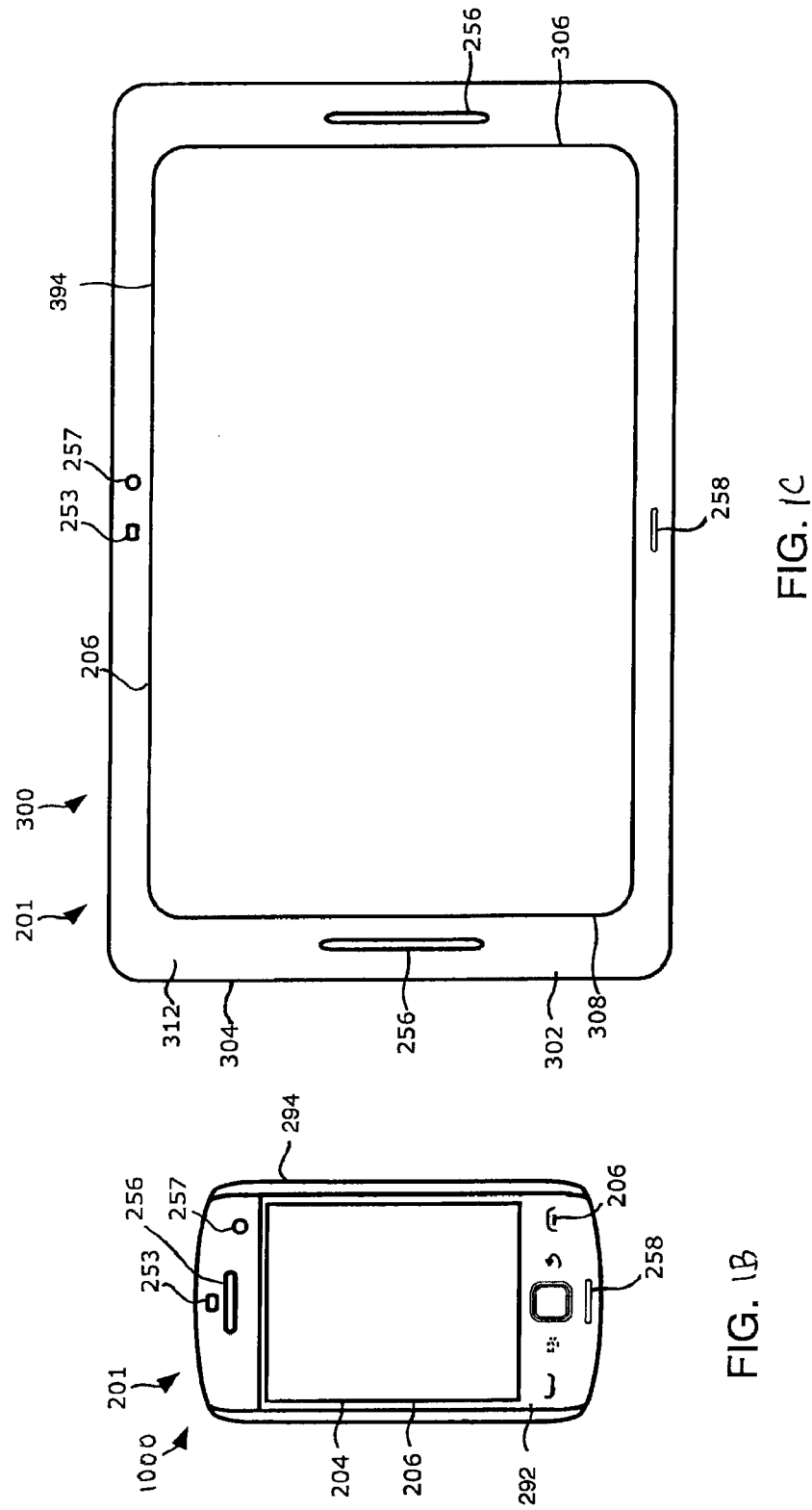

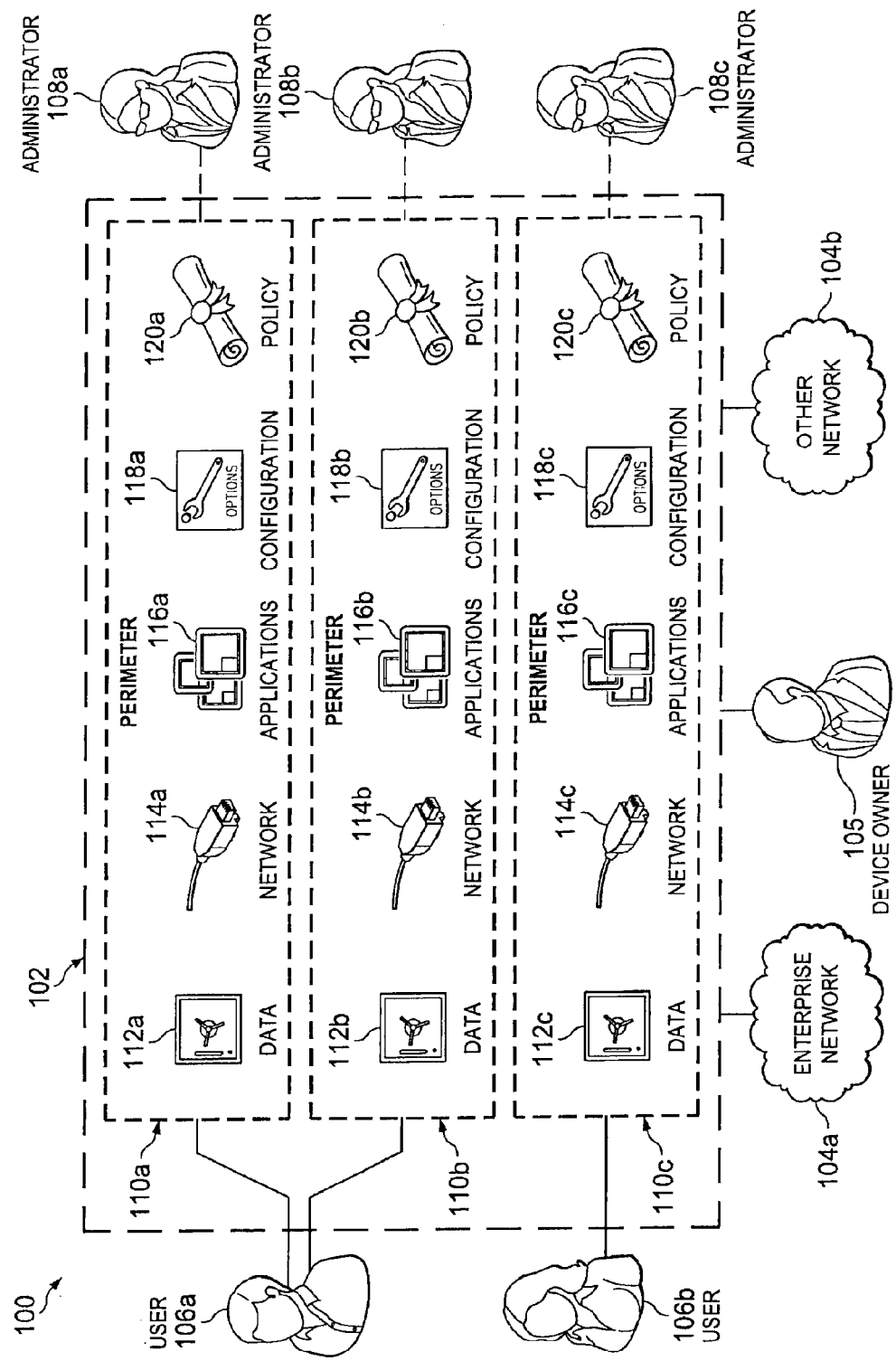

METHODS AND SYSTEMS FOR IMPLEMENTING SECURITY POLICIES ON A MOBILE DEVICE

TECHNICAL FIELD

The present disclosure relates generally to methods and systems for implementing security policies on a mobile device, for example to avoid tampering, or other modifications or programs, data and/or access authorization.

BACKGROUND

Employees are increasingly using their personal mobile devices in the corporate environment. A corporation often wishes to impose security policies on such devices, in order to protect the security of the corporation. However, employees often find it intrusive when such security policies are applied to personal data on the device.

Attempts to separate personal and corporate data on the device using software applications often are unsatisfactory, since the boundary between personal and corporate data may be changed and/or made permeable using the same or different software on the device.

It would be useful to provide a corporation or enterprise with the administrative control needed to address security concerns, while balancing this need with the desire of the user for privacy and freedom to use the device without undue constraint from a corporate administrator.

BRIEF DESCRIPTION OF THE DRAWINGS

Reference will now be made to the drawings, which show by way of example embodiments of the present disclosure, and in which:

FIG. 1B shows an example of the wireless device of FIG. 1A in the form of a smartphone;

FIG. 1C shows an example of the wireless device of FIG. 1A in the form of a tablet computer;

FIG. 2 schematically illustrates implementation of perimeters in an example wireless device;

It will be noted that throughout the appended drawings, like features are identified by like reference numerals.

DETAILED DESCRIPTION

Figure 1A:
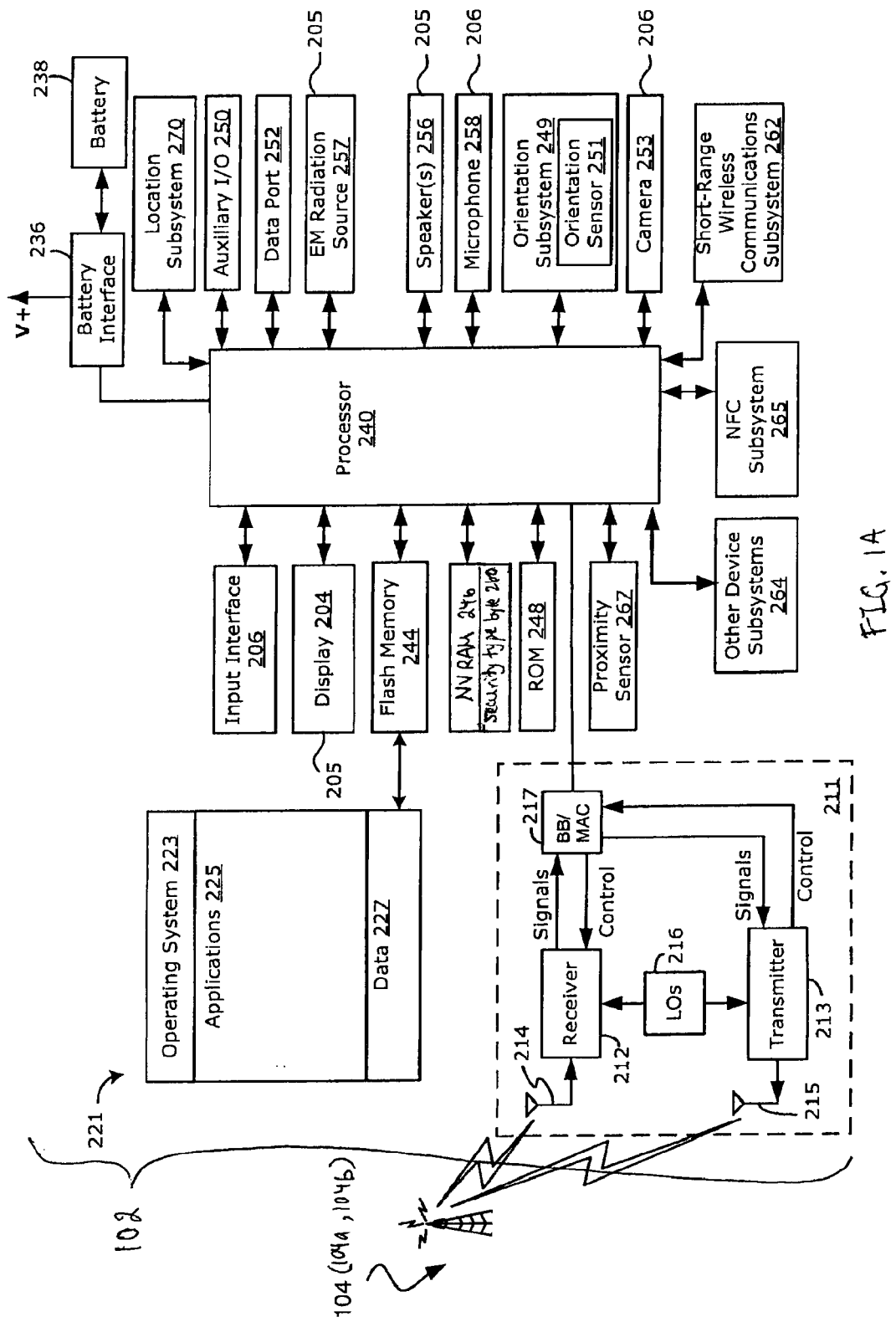
FIG. 1A schematically shows an example wireless device.

In some example aspects, the present disclosure provides a wireless device comprising: a non-volatile memory comprising a designation of a security type hard-coded in the non-volatile memory; and a processor coupled to the non-volatile memory, the processor being configured to execute computer-readable instructions to cause the device to: determine, based on the security type, whether a received security policy governing behavior of one or more resources designated as personal is applicable to the one or more resources designated as personal; if the security type is determined to indicate that the received security policy is not applicable to the one or more resources designated as personal, not apply the security policy to the one or more resources designated as personal; and if the security type is determined to indicate that the received security policy is applicable to the one or more resources designated as personal, apply the security policy to the one or more resources designated as personal.

In some examples, if the security type is determined to indicate that the received security policy is not applicable to the one or more resources designated as personal, the security policy may be applied only to any resources not designated as personal.

In some examples, the security type may be one of: personal-liable, which indicates that no security policies are applicable to resources designated as personal; corporate-liable, which indicates that at least one security policy is applicable to resources designated as personal; and regulated, which indicates that all security policies are applicable to resources designated as personal.

In some examples, the security policy may include at least one of: a whole-device password policy; a whole-device encryption policy; a whole-device wipe policy; a personal data access policy; an email audit trail creation policy; and a messaging audit trail creation policy.

In some examples, the security type may be not changeable by any application executed by the processor.

In some examples, the security type may be hard-coded in a byte of the non-volatile memory.

In some example aspects, the present disclosure provides a method for setting a security type on a wireless device, the method comprising: after receiving a request for registration of the wireless device on a network, determining, based on at least one of the request and a network type of the network, a security type for the wireless device; and transmitting instructions to the wireless device to cause the determined security type to be hard-coded in a non-volatile memory of the wireless device.

In some examples, a designation of the security type may be hard-coded in a byte of the non-volatile memory.

In some examples, if the network type is an enterprise network, the security type may be determined to indicate permission to apply at least one security policy governing one or more resources designated as personal on the device.

In some examples, if the network type is a public network, the security type may be determined to indicate protection against applying a security policy governing one or more resources designated as personal on the device.

In some examples, the request may include an upgrade key, and the security type may be determined to indicate permission to apply all security policies governing one or more resources designated as personal on the device.

In some examples, the method may include receiving signals from the wireless device indicating that the security type of the device has been changed or has not been changed.

In some examples aspects, the present disclosure provides a method for setting a security type on a wireless device, the method comprising: receiving instructions to change the security type of the device from a first security type to a second security type; determining whether the security type of the device is changeable; after determining that the security type of the device is changeable, changing, in a non-volatile memory of the device, from the first security type to the second security type; and after determining that the security type of the device is not changeable, maintaining the first security type.

In some examples, determining whether the security type of the device is changeable may be based on at least one of: a permission flag stored on the device; the first security type; and the second security type.

In some examples, when the permission flag indicates the security type is not changeable, it may be determined that the security type of the device is not changeable.

In some examples, when: the first security type indicates permission to apply one or more security policies governing one or more resources designated as personal on the device; and the second security type indicates permission to apply all security policies governing one or more resources designated as personal on the device; it may be determined that the security type of the device is changeable.

In some examples, the method may include, after changing the security type of the device to the second security type, changing the permission flag to indicate that the security type is not changeable.

In some examples, the method may include transmitting signals to indicate that the security type of the device has changed or has not changed.

In some examples, the instructions to change the security type may be received from an authorized source, and it may be determined that the security type of the device is changeable.

In various aspects and examples, the present disclosure may enable different security policies to be applied depending on the security type of a device. Security type may include corporate-liable, personal-liable and regulated, as will be described further below. For example, an enterprise security policy may apply differently to corporate-liable devices than to personal-liable devices. This may allow the same device model to have different behavior within the same corporation, depending on the security type of the device.

FIG. 1A schematically illustrates an example wireless communication device 102 which may communicate in a communication system with one or more wireless communication networks. In the example shown, the wireless device 102 is a communication device and, such as a mobile communication device having data and voice communication capabilities, and configured to communicate with other computer systems (e.g. via the Internet). The wireless device 102 may take other forms.

Depending on the functionality provided by the wireless device 102, in various example embodiments the wireless device 102 may be a multiple-mode communication device configured for both data and voice communication, a mobile telephone, such as a smartphone, a wearable computers such as a watch, a tablet computer such as a slate computer, a personal digital assistant (PDA), or a computer system. The wireless device 102 may take other forms apart from those specifically listed above. The electronic device may also be referred to as a mobile communications device, a communication device, a mobile device and, in some cases, as a device.

The wireless device 102 may communicate with a wireless communication network 104, such as a wireless local area network (WLAN). For example, the wireless network 104 and the wireless device 102 may operate in accordance with IEEE 802.11 standards.

The wireless network 104 may be a public network or a private network. For example, the wireless network 104 may be a private communication network (e.g., virtual private network (VPN)) of an enterprise (e.g. an organization, a company, a corporation, among others). The wireless network 104 may include one or more wireless access points (APs), one or more servers, and one or more gateways. The AP(s) and/or gateway(s) may be configured to permit or deny access to the data, applications, and/or functionality offered via the wireless network 104, for example depending on whether or not a device has been authorized and what access rights are given upon authorization.

The wireless network 104 (which may be an infrastructure WLAN) may provide or allow access to various data and communication services to its terminals. For example, the wireless networks may provide for communication access to the Internet via a web browser application, or voice telephony communication service with use of Voice over IP (VoIP) communication, or other communication services. For "push-type" data or message synchronization services, for example, the wireless device 102 may be enabled to maintain data synchronization with a server for user data of an application associated with a user account.

The wireless device 102 may be additionally configured to access communication services via a Public Land Wireless Network (PLMN) (e.g. a cellular telecommunications network). For communication with PLMNs, the wireless device 102 may be configured in accordance with one or more cellular telecommunication standards, such as Global Systems for Mobile (GSM) and/or General Packet Radio Service (GPRS) technologies. However, such wireless device may additionally or alternatively operate in accordance with other such cellular standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

Further, in additional to being operative for communications with infrastructure WLANs (e.g. IEEE 802.11 infrastructure WLANs), the wireless device 102 may additionally or alternatively communicate using peer-to-peer communication techniques, for example, in accordance with the Wi-Fi Peer-To-Peer (P2P) Technical specification, and/or be certified as a "Wi-Fi Direct" device. The Wi-Fi Peer-To-Peer (P2P) Technical specification is hereby incorporated by reference herein.

The wireless device 102 may include a controller including one or more processors 240 (such as a microprocessor) for controlling the overall operation of wireless device 102. The processor 240 may interact with one or more device subsystems, such as one or more wireless communication subsystem 211 for exchanging radio frequency signals with wireless network 104 to perform communication functions. The processor 240 may be communicably coupled with one or more additional device subsystems, such as one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)), associated with one or more touchscreen displays 204, one or more orientation subsystems 249, one or more memories (such as flash memory 244, non-volatile random access memory (NVRAM) 246, read only memory (ROM) 248, among others), one or more auxiliary input/output (I/O) subsystems 250, one or more data ports 252 (which may be a serial data port, such as a Universal Serial Bus (USB) data port), one or more near field communications (NFC) subsystems 265, one or more short-range communication subsystems 262 and other suitable device subsystems generally designated as 264. One or more of the subsystems may perform communication-related functions, whereas other subsystems may provide "resident" or on-device functions.

In some examples, the wireless device 102 may include one or more touchscreen displays which may serve as both an input interface 206 (e.g., a touch-sensitive overlay) and an output interface 205 (e.g., a display). The touchscreen display(s) may be constructed using a touch-sensitive input surface connected to an electronic controller and which overlays the display 204. The touch-sensitive overlay and the electronic controller may provide a touch-sensitive input interface 206 and the processor 240 may interacts with the touch-sensitive overlay via the electronic controller. In some examples, the touch-sensitive overlay may have a touch-sensitive input surface which is larger than the display 204. For example, the touch-sensitive overlay may extend overtop of a frame 312 (see FIG. 1B) which may surround the display 204. In such example embodiments, the frame 312 may be referred to as an active frame since it may be capable of acting as an input interface 206. In some examples, the touch-sensitive overlay may extend to the sides of the wireless device 102.

In some examples, the wireless device 102 may include communication subsystem(s) 211 which may allow the wireless device 102 to communicate over the wireless network 104. The communication subsystem(s) 211 may include a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the wireless device 102 and a single antenna may be shared by both receiver and transmitter. The particular design of the wireless communication subsystem(s) 211 may depend on the wireless network 104 in which the wireless device 102 is intended to operate.

In some examples, the wireless device 102 may communicate with any one of a plurality of stations or APs of the wireless network 104 within its geographic coverage area. For example, the wireless device 102 may send and receive communication signals over the wireless network 104 after the required network registration or activation procedures have been completed. Signals received by the antenna 214 from the wireless network 104 may be input to the receiver 212, which may perform various receiver functions including, for example, signal amplification, frequency down conversion, filtering, and channel selection, as well as analog-to-digital (ND) conversion. ND conversion of a received signal may allow more complex communication functions such as demodulation and decoding to be performed in the DSP 217. Signals to be transmitted may be processed, including modulation and encoding, for example, by the DSP 217. These DSP-processed signals may be input to the transmitter 213 for processing, such as digital-to-analog (D/A) conversion, frequency up conversion, filtering, amplification, and transmission to the wireless network 104 via the antenna 215. The DSP 217 may not only process communication signals, but may also provide for receiver and transmitter control. For example, the gains applied to communication signals in the receiver 212 and the transmitter 213 may be adaptively controlled through automatic gain control algorithms implemented in the DSP 217.

In some examples, the auxiliary input/output (I/O) subsystem(s) 250 may include an external communication link or interface, such as an Ethernet connection. The wireless device 102 may include other wireless communication interfaces for communicating with other types of wireless networks, for example, a wireless network such as an orthogonal frequency division multiplexed (OFDM) network. The auxiliary I/O subsystem(s) 250 may include a vibrator for providing vibratory notifications in response to various events on the wireless device 102, such as receipt of an electronic communication or incoming phone call, or for other purposes such as haptic feedback (touch feedback).

The data port(s) 252 may be used for synchronization with an external computing system, such as a user's host computer system (not shown). The data port(s) 252 may enable a user to set one or more preferences through an external device or software application and may extend the capabilities of the wireless device 102 by enabling information and/or software downloads to the wireless device 102 other than through the wireless network 104. An alternate download path may for example, be used to load an encryption key onto the wireless device 102 through a direct, reliable and trusted connection to thereby provide secure device communication. The data port(s) 252 may also allow for specialized and/or secure configuration or reconfiguration of the wireless device 102 at a manufacturer or at a repair facility, for example.

In some examples, the wireless device 102 may include one or more device orientation subsystems 249 including one or more orientation sensors 251 connected to the processor 240, and which may be controlled by a monitoring circuit and/or operating software. The orientation sensor(s) 251 may detect the orientation of the wireless device 102 and/or other information, such as acceleration, from which the orientation of the wireless device 102 may be determined. The orientation sensor(s) 251 may generate orientation signals which may indicate the orientation of the wireless device 102. The orientation signals, in some examples, may specify the orientation of the wireless device 102 relative to the gravitational field of the earth.

In some examples, the orientation sensor(s) 251 may be an accelerometer, such as a three-axis accelerometer. An accelerometer may be any sensor which converts acceleration from motion (e.g. movement of the wireless device 102 or a portion thereof due to a strike force) and gravity which may be detected by a sensing element into an electrical signal (e.g., producing a corresponding change in output). The accelerometer may have a one, two or three axis configuration. Higher order axis configurations are also possible. The accelerometer may produce digital or analog output signals depending on the type of accelerometer.

In some example embodiments, the orientation subsystem(s) 249 may include other orientation sensors 251, instead of or in addition to accelerometer(s). For example, the orientation subsystem(s) 249 may include a gravity sensor, a gyroscope, a tilt sensor, an electronic compass or other suitable sensor, or combinations thereof. In some examples, the device orientation subsystem(s) 249 may include two or more orientation sensors 251 such as an accelerometer and an electronic compass.

In some examples, the wireless device 102 may include one or more near field communications (NFC) subsystems 265. The NFC subsystem(s) 265 is configured to communicate with other wireless devices 102 and/or tags, using an NFC communications protocol. NFC may be a set of short-range wireless technologies which enables short-range (e.g., a distance of 4 cm or less) communications. The NFC subsystem(s) 265 may include an NFC chip and an NFC antenna.

The wireless device 102 may include one or more microphones and/or one or more speakers. In some examples, the wireless device 102 may include a plurality of speakers 256. For example, the wireless device 102 may include two or more speakers 265. The speakers 256 may, for example, be disposed in spaced relation to one another. In some examples, the wireless device 102 may include a first speaker and a second speaker, where the first speaker and the second speaker may be spatially separated from one another (e.g., within the wireless device 102). In some examples, the display 204 may be disposed between the first speaker and the second speaker. For example, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display. In some examples, each speaker 256 may be associated with a separate audio channel. The multiple speakers 256 may, for example, be used to provide stereophonic sound (which may also be referred to as stereo).

The wireless device 102 may also include one or more cameras 253. The camera(s) 253 may be capable of capturing images in the form of still photographs and/or motion video. In some examples, the wireless device 102 may include one or more front facing cameras 253, which may be configured to capture images from the view point of a front face of the wireless device 102. The front face may be defined as the face on which the display 204 is mounted. That is, the display 204 may be configured to display content which may be viewed from a side of the wireless device 102 from which the camera(s) 253 is directed. The front facing camera(s) 253 may be located anywhere on the front surface of the wireless device 102. For example, the front facing camera(s) 253 may be located above or below the display 204. The front facing camera(s) 253 may be a fixed position camera which may not be movable relative to the display 204 of the wireless device 102 and/or the housing of the wireless device 102. In such examples, the direction of capture of the camera(s) 253 may be predictable relative to the display 204 and/or the housing. In some examples, a camera 253 may be provided in a central location relative to the display 204 to facilitate image acquisition of a face, for example. The wireless device 102 may also include one or more rear facing cameras 253, which may be configured to capture images from the view point of a rear face of the wireless device 102. The rear face of the wireless device 102 may be defined as the face opposite to the front face. The rear facing camera(s) 253 may be positioned to allow capture of a target while displaying the captured image one the display, for example.

In some examples, the wireless device 102 may include an electromagnetic (EM) radiation source 257. In some examples, the EM radiation source 257 may be configured to emit EM radiation from the side of the wireless device 102 which is associated with a camera 253. For example, where the camera 253 is a front facing camera 253, the EM radiation source 257 may be configured to emit EM radiation from the front face of the wireless device 102. That is, the EM radiation source 257 may be configured to emit radiation in a direction which may be detected by the camera 253. That is, the camera 253 and the EM radiation source 257 may be disposed on the wireless device 102 so that EM radiation emitted by the EM radiation source 257 may be captured in images obtained by the camera 253.

In some examples, the EM radiation source 257 may be an infrared (IR) radiation source which is configured to emit IR radiation. In some examples, the EM radiation source 257 may be configured to emit radiation which is not part of the visible spectrum. The camera 253 may be configured to capture radiation of the type emitted by the EM radiation source 257. For example, the camera 253 may be configured to capture at least some EM radiation which is not in the visible spectrum.

In some examples, the wireless device 102 may be provided with one or more service routing application programming interfaces (APIs) which may provide an application with the ability to route traffic through a serial data (e.g., USB) or Bluetooth® (Bluetooth® is a registered trademark of Bluetooth SIG, Inc.) connection to an external (e.g., host) computing system using standard connectivity protocols. For example, when a user connects the wireless device 102 to a host computer system via a USB cable or a Bluetooth® connection, any traffic from the host computer system that was destined for the wireless network 104 may be automatically routed to the wireless device 102 using the USB cable or Bluetooth® connection. Similarly, any traffic from the wireless device 102 that was destined for the wireless network 104 may be automatically sent over the USB cable Bluetooth® connection to the host computer system for processing.

In some examples, the wireless device 102 may include one or more batteries 238 as a power source, for example one or more rechargeable batteries 238 that may be charged, for example through charging circuitry coupled to one or more battery interfaces 236 such as a data port 252. The battery(ies) 238 may provide electrical power to at least some of the electrical circuitry in the wireless device 102, and the battery interface(s) 236 may provide a mechanical and/or electrical connection for the battery(ies) 238. The battery interface(s) 236 may be coupled to a regulator (not shown) which may provide a regulated voltage to the circuitry for powering the wireless device 102.

In some examples, the wireless device 102 may include one or more short-range communication subsystems 262 which may provide for wireless communication between the wireless device 102 and other devices (e.g., another wireless device 102). The short-range communication subsystem(s) 262 may be used to provide a preferred device mode between the wireless device 102 and another wireless device which may, in at least some example embodiments, be a wireless device which is the same or similar to the wireless device 102. In some examples, the short-range communication subsystem(s) 262 may be a wireless bus protocol compliant communication mechanism such as a Bluetooth® communication module to provide for communication with similarly-enabled systems and devices.

In some examples, the wireless device 102 may store data 227 in an erasable persistent memory, which may be the flash memory 244. In some examples, the data 227 may include service data including information required by the wireless device 102 to establish and maintain communication with the wireless network 104. The data 227 may also include user application data such as email messages, address book and contact information, calendar and schedule information, notepad documents, image files, and other user information stored on the wireless device 102 (e.g., by a user), and other data. The data 227 stored in the persistent memory (e.g. flash memory 244) of the wireless device 102 may be organized, at least partially, into one or more databases and/or data stores. The database(s) and/or data store(s) may contain data items of the same data type or associated with the same application. For example, email messages, contact records, and task items may be stored in respective individual databases within the device memory.

The wireless device 102 may, in some examples, be a mobile communication device which may provide at least two principal modes of communication, including a data communication mode and a voice communication mode. In the data communication mode, a received data signal such as a text message, an email message, or Web page download may be processed by the communication subsystem(s) 211 and input to the processor(s) 240 for further processing. For example, a downloaded Web page may be further processed by a browser application or an email message may be processed by an email messaging application and output to the display(s) 204. A user of the wireless device 102 may also compose data items, such as email messages; for example, using the input device(s) in conjunction with the display(s)

204. These composed items may be transmitted through the communication subsystem(s) 211 over the wireless network 104.

In the voice communication mode, the wireless device 102 may provide one or more telephony functions and may operate as a cellular phone. Received signals would be output to the speaker(s) 256 and signals for transmission may be generated by a transducer such as the microphone(s) 258. The telephony function(s) may be provided by software/firmware (e.g., a voice communication module) and/or hardware (e.g., the microphone(s) 258, the speaker(s) 256 and/or input interface(s) 206). Other voice or audio I/O subsystems, such as a voice message recording subsystem, may also be implemented on the wireless device 102. Although voice or audio signal output may be accomplished through the speaker(s) 256, the display(s) 204 may also be used to provide an indication of the identity of a calling party, duration of a voice call, or other voice call related information.

The processor(s) 240 may operate under stored program control and may execute one or more software modules 221 stored in a memory such as a persistent memory, for example, in the flash memory 244. The software module(s) 221 may include, for example, operating system software 223 and other software applications 225.

The software application(s) 225 resident in the wireless device 102 may include various applications, including, for example, a notepad application, an Internet browser application, a voice communication (e.g., telephony) application, a mapping application, a media player application, or any combination thereof. Each of the software application(s) 225 may include layout information defining the placement of particular fields and graphic elements (e.g. text fields, input fields, icons, among others) in a user interface according to the application 225.

The software module(s) 221 or parts thereof may be temporarily loaded into a volatile memory. Volatile memory may be used for storing runtime data variables and other types of data or information. Although specific functions are described for various types of memory, this is merely one example, and a different assignment of functions to different types of memory may be used.

A predetermined set of application(s) 225 that control basic device operations, including data and possibly voice communication applications may be installed on the wireless device 102 during or after manufacture. Additional application(s) and/or upgrade(s) to the operating system 223 and/or software application(s) 225 may also be loaded onto the wireless device 102 through wireless network 104, the auxiliary I/O subsystem(s) 250, the data port(s) 252, the short-range communication subsystem(s) 262, and/or other suitable subsystem(s) 264. The downloaded program(s) or code module(s) may be permanently installed; for example, written into the program memory (e.g., the flash memory 244), or written into and executed from volatile memory for execution by the processor(s) 240 at runtime.

Non-volatile memory, such as the NVRAM 246, may contain instructions that may be hard-coded into the wireless device 102, which may not be accessible by applications 225 executed by the processor(s) 240. For example, the NVRAM 246 may include data designating a device security type, such as a security type byte 260. The security type byte 260 may reside in and/or be governed by the operating system 223. The operating system 223 may protect the security type byte 260 from being tampered with or otherwise changed by unauthorized personnel. For example, there may be a permission field or flag (which may be maintained and/or protected, for example by the operating system 223, against unauthorized change), such as a "security type changeable" field or "device class permanent" flag (not shown), to indicate whether the security type byte 260 is changeable. For example, such a permission field or flag may be protected against tampering by enabling changing of the permission field or flag only by a root process on the device 102, such as a task generated by the operating system 223 and/or by a root user. A manufacturer and/or repair facility may be able to access and change the value of the permission field or flag directly as a root user, but this may not be possible for unauthorized parties. The security type byte 260 will be further described below.

FIG. 1B, shows a front view of an example wireless device 102, which may be referred to as a smartphone 1000. The smartphone 1000 may be a mobile phone which may offer more advanced computing capability than a basic non-smartphone cellular phone. For example, the smartphone 1000 may have the ability to execute third party application(s) which may be stored on the smartphone 1000.

The smartphone 1000 may include the components discussed above with reference to FIG. 1A or a subset of those components. The smartphone 1000 may includes a housing 294 which houses at least some of the components discussed above with reference to FIG. 1A.

For example, the smartphone 1000 may include a display 204, which may be a touchscreen display which may serve as an input interface 206. The display 204 may be disposed so that it is viewable on a front side 292 of the smartphone 1000. That is, a viewable side of the display 204 may be disposed on the front side 292 of the smartphone 1000. In the example shown, the display 204 may be framed by the housing 294.

The smartphone 1000 may include other input interfaces 206 such as one or more buttons, keys or navigational input mechanisms. In the example illustrated, at least some of these additional input interfaces 206 may be disposed for actuation from the front side 292 of the smartphone 1000.

The smartphone 1000 may include a speaker 256. In the example illustrated, the smartphone 1000 may include a single speaker 256 which may be disposed vertically above the display 204 when the smartphone 1000 is held in a portrait orientation where its height is longer than its width (e.g., as shown in FIG. 1B). The speaker 256 may be disposed on the front face of the smartphone 1000.

While the example smartphone 1000 of FIG. 1B includes a single speaker 256, in other examples, the smartphone 1000 may include a greater number of speakers 256. For example, in some examples, the smartphone 1000 may include a second speaker 256 which may be disposed vertically below the display 204 when the smartphone 1000 is held in a portrait orientation where its height is longer than its width.

The smartphone 1000 may include a microphone 258. In the example illustrated, the microphone 258 may be vertically disposed below the display 204 when the smartphone 1000 is held in the portrait orientation. The microphone 258 and at least one speaker 256 may be arranged so that the microphone 258 is in close proximity to a user's mouth and the speaker 256 is in close proximity to a user's ear when the user holds the smartphone 1000 in a manner for conversing using the smartphone 1000.

The smartphone 1000 may include a front facing camera 253 which may be located vertically above the display 204 when the smartphone 1000 is held in a portrait orientation where its height is longer than its width. The front facing camera 253 may be located so that it may capture images of objects which are located in front of and/or surrounding the front side of the smartphone 1000.

The smartphone 1000 may include an EM radiation source 257. The EM radiation source 257 may be disposed on the front side 292 of the smartphone 1000. In this orientation, EM radiation produced by the EM radiation source 257 may be projected onto objects which are located in front of and/or surrounding the front side of the smartphone 1000. Such EM radiation (or the projection of EM radiation onto objects) may be captured on images obtained by the camera 253.

In some examples, the wireless device 102 may be a tablet computer 300 (also referred to as a "tablet"), an example of which is illustrated in FIG. 1C. The tablet computer 300 may include the same or different features and components of the smartphone 1000, as described above. The tablet computer 300 may be generally larger than the smartphone 1000. The tablet computer 300 may include the components discussed above with reference to FIG. 1A or a subset of those components. The tablet computer 300 may include a housing 394 which houses at least some of the components discussed above with reference to FIG. 1A.

The tablet computer 300 may include a display 304, which may be a touchscreen display which acts as an input interface 206. The display 304 may be disposed on the tablet computer 300 so that the display 304 may be viewable at a front side 302 of the tablet computer 300. That is, a viewable side of the display 304 may be disposed on the front side 302 of the tablet computer 300. In the example illustrated, the display 304 may be framed by the housing 394, with use of a frame 312 which may surround the display 304. The frame 312 may be a portion of the housing 394 which may provide a border around the display 304. In some examples, the frame 312 may be an active frame 312. That is, the frame 312 may include a touch sensitive overlay which may enable the tablet computer 300 to detect a touch input applied to the frame 312, thereby enabling the frame 312 to serve as an input interface 206.

The tablet computer 300 may include one or more speakers 256. In the example illustrated, the tablet computer 300 may include two speakers 256. The two speakers 256 may be disposed on opposing sides of the display 304. For example, when tablet computer 300 is held in a landscape orientation (such as the orientation illustrated in FIG. 1B) where its width is longer than its height, one of the two speakers 256 may be disposed on a right side 306 of the display 304 and another of the speakers may disposed on the left side 308 of the display 304. Both speakers 256 may be disposed on the front side 302 of the tablet computer 300.

The tablet computer 300 may include a microphone 258. In the example illustrated, the microphone 258 may be vertically disposed below the display 304 when the tablet computer 300 is held in the landscape orientation. The microphone 258 may be located in other locations in other examples.

The tablet computer 300 may include a front facing camera 253 which may be located vertically above the display 304 when the tablet computer 300 is held in a landscape orientation. The front facing camera 253 may be located so that it may capture images of objects which are located in front of and/or surrounding the front side of the tablet computer 300.

The tablet computer 300 may include an EM radiation source 257. The EM radiation source 257 may be disposed on the front side 304 of the tablet computer 300. In this orientation, EM radiation produced by the EM radiation source 257 may be projected onto objects which are located in front of and/or surrounding the front side 302 of the tablet computer 300. Such EM radiation (or the projection of EM radiation onto objects) may be captured on images obtained by the camera 253.

Although certain example wireless devices 102 have been described, any suitable wireless communication device or terminal may be part of the methods and devices described herein. Although the description of the architecture relates to a specific example where the wireless network or WLAN is an IEEE 802.11-based network, different environments may be applicable as well. The wireless network may be, for example, a WiMAX-based network (i.e. IEEE 802.16), or an Ultra-WideBand (UWB)-based network (i.e. IEEE 802.15), among others.

FIG. 2 is a schematic diagram showing an example data communication system 100. The example data communication system 100 includes the device 102, the network(s) 104, for example an enterprise network 104a, and other networks 104b. A data communication system may include additional, different, or fewer features, as appropriate. The diagram in FIG. 2 also shows interactions by users 106a, 106b, by a device owner 105, and by administrators 108a, 108b, 108c. In some cases, the device owner 105 can be one of the users 106a or 106b, a business enterprise, or another entity. Additional, different, or fewer entities may interact with a data communication system, as appropriate in various implementations.

The device 102 may be any suitable computing device, such as the example device 102 of FIGS. 1A-1C. The device 102 may be connected to multiple networks, such as the enterprise network 104a and the other networks 104b. The enterprise network 104a is a network associated with an enterprise. The enterprise network 104a can include a wireless network, a virtual private network, a wired network, or any suitable network. The enterprise can be a corporate or business entity, a government body, a non-profit institution, or any other organization. The enterprise may be the device owner 105. The enterprise may also lease the device 102 or may hire contractors or agents who are responsible for maintaining, configuring, controlling, or managing the device 102. The other networks 104b can include any suitable networks that are accessible by a user. For example, the other networks can include a public network that the user has an account for, a private network, an ad hoc network, or another type of network. In some cases, the other networks 104b include a cellular data network. In some cases, the other networks 104b include a user's home network.

The networks 104a and 104b facilitate communication with the device 102. Either of the networks 104a and 104b may communicate, for example, Internet Protocol (IP) packets, Frame Relay frames, Asynchronous Transfer Mode (ATM) cells, voice, video, data, and other suitable information between network addresses. In addition, while the enterprise network 104a and the other networks 104b are each illustrated as a single network, each network may include multiple networks and may provide access to additional networks. In short, the enterprise network 104a and the other networks 104b may include any suitable network configured to communicate with the device 102.

As shown in FIG. 2, operations of the device 102 may be separated or otherwise separately governed by one or more perimeters, such as three example perimeters 110a, 110b, and 110c (individually and collectively referred to as perimeter(s) 110).

A perimeter 110 may refer to a logical separation of computing resources such that transferring data between perimeters and accessing resources of other perimeter can be controlled. Resources may include applications, file systems, network access, or other computer resources. A policy may define what specific external resources a resource in a perimeter may access. In operation, a user may be provided with a seamless experience when accessing resources of different perimeters 110, to the extent that the user may not be aware that he has crossed between different perimeters 110.

Each perimeter 110 may be associated with respective resources including, for example, data, one or more network access resources 114, one or more applications 116, one or more configuration files 118 and/or one or more perimeter policies 120. A perimeter 110a may be used to separate its associated data 112a, network access resource(s) 114a, application(s) 116a, configuration file(s) 118a, and/or perimeter policy(ies) 120a from the data 112b, 112c, network access resource(s) 114b, 114c, application(s) 116b, 116c, configuration file(s) 118b, 118c and/or perimeter policy(ies) 120b, 120c associated with another perimeter 110b, 110c and/or any non-perimetered data, resource(s), application(s), configuration file(s) and/or policy(ies) on the device 102. Data 112a, 112b, 112c may be collectively referred to as data 112; network access resources 114a, 114b, 114c may be collectively referred to as network access resource(s) 114; applications 116a, 116b, 116c may be collectively referred to as application(s) 116; configuration files 118a, 118b, 118c may be collectively referred to as configuration file(s) 118; and perimeter policies 120a, 120b, 120c may be collectively referred to as perimeter policy(ies) 120. A perimeter 110 may be associated with a subset of the example resources described above, or a perimeter 110 may include additional or different resources.

The example perimeters 110 can logically separate resource(s) (e.g., application(s) 116, data 112, network access resource(s) 114 and/or configuration file(s) 118, among others) such that resources in a given perimeter (e.g., perimeter 110a) can, in various examples, be prevented from accessing resources included in a different perimeter (e.g., perimeter 110b, 110c). For example, the perimeters 110 may prevent personal resources in one perimeter from accessing corporate resources in another perimeter, or vice-versa. In some cases, an enterprise may define a secured corporate perimeter on a device 102 without interfering with the user's personal experience (e.g., operations within a private personal perimeter) on the same device 102. In some examples, the perimeters 110 may also permit cross-perimeter access to resources. Access to perimeter resources may be controlled by defining, assigning or otherwise associating a perimeter policy 120 to each perimeter 110.

A perimeter 110 may include password protection, encryption, and other process for controlling access to resources assigned to the perimeter 110. A perimeter 110 (and its associated resources) may be defined by the device owner, a user, an administrator, or others. In some examples, the perimeter 110a may be a personal perimeter created for the user 106a and managed by the user 106a. In some examples, the perimeter 110b may be an enterprise perimeter created by an administrator 108b for an enterprise and may be managed by a remote management server. In addition, a given perimeter may be accessed by the device owner 105, a user, an administrator, any suitable combination. In some implementations, each perimeter may be associated with a single user, and at least some users may access multiple device perimeters. For example, a first user 106a may access resources within both the perimeter 110a and the perimeter 110b, and a second user 106b may have access to only one perimeter 110c.

In various examples, one or more individual perimeters 110 may be added, deleted, or modified (e.g., by any of the user 106a, 106b, the device owner 105 and the administrator 108a, 108b, 108c). For example, an organization associated with the enterprise network 104a can send the device 102 instructions defining one or more resources (e.g., applications, policies, configurations, among others) for a new perimeter 110. In another example, an administrator 108 may assign one or more policies 120 for a perimeter 110 and/or initiate perimeter updates. In some examples, the administrator 108 may remotely (e.g., through the enterprise network 104a) lock and/or wipe one or more resources of a perimeter 110.

A perimeter policy 120 may be implemented in any suitable format, using any appropriate information. A perimeter policy 120a of a given perimeter 110a may define what external resources (e.g., in another perimeter 110b, 110c) can be accessed by internal application(s) 116a running in the perimeter 110a and/or what resources internal to the perimeter 110a can be accessed by external application(s) (e.g., application(s) 116b, 116c of another perimeter 110b, 110c). For example, a given perimeter's perimeter policy 120a may identify other perimeter(s) 110b, 110c that are accessible, internal resource(s) that are not accessible to other perimeter(s) 110b, 110c, or both. A perimeter policy 120 may also identify any user(s) that can or cannot access specified resources in the perimeter 110 (e.g., a corporate administrator may not be permitted to access data in a user's personal perimeter). In some examples, the policies 120a, 120b of two perimeters 110a, 110b may define whether cross-perimeter access to resources is granted, or, if there is a conflict, the strictest policy can be applied. For example, where the first perimeter 110a is an enterprise perimeter and the second perimeter 110b is a personal perimeter, both sets of policies 120a and 120b may be used to determine whether the personal applications 116b can access the enterprise network 104a. If the policies 120a, 120b conflict, then access may be granted according to the strictest policy 120a, 120b.

Data 112 can include any suitable information. The device 102 can store various objects, including files, classes, frameworks, backup data, business objects, jobs, web pages, web page templates, database tables, repositories storing business and/or dynamic information, and any other appropriate information including any parameters, variables, algorithms, instructions, rules, constraints, or references thereto. Data 112 may include information that is associated with an application, a network, a user, and other information.

The network access resources 114 can include any suitable parameters, variables, policies, algorithms, instructions, settings, or rules for granting access to networks. For example, the network access resources 114a may include or identify firewall policies for accessing the enterprise network 104a. As another example, the network access resources 114b may include or identify account data for accessing one or more of the other networks 104b. In some implementations, network access resources include or otherwise identify one or more of the following: a username; a password; a security token; a Virtual Private Network (VPN) configuration; firewall policies; a communication protocol; encryption key certificate; or others.

The applications 116 can include any suitable program, module, script, process, or other object that can execute, change, delete, generate, or process information. For example, applications can be implemented as Enterprise Java Beans (EJBs). Design-time components may have the ability to generate run-time implementations into different platforms, such as J2EE (Java 2 Platform, Enterprise Edition), ABAP (Advanced Business Application Programming) objects, or Microsoft's .NET. Further, while illustrated as internal to the device 102, one or more processes associated with the applications 116 may be stored, referenced, or executed remotely. For example, a portion of the applications 116 may be an interface to a web service that is remotely executed. Moreover, the applications 116 may be a child or sub-module of another software module (not illustrated).

The configuration files 118 can include any suitable parameters, variables, policies, algorithms, instructions, settings, or rules for configuring software of the device 102. For example, the configuration files 118 may include a table that identifies settings for one or more applications 116. In some implementations, the configuration files 118 identify initial settings for one or more applications 116, and for other types of applications such as operating system settings. The configuration files 118 may be written in any suitable format, such as, for example, ASCII and line-oriented, among others The policies 120 may include any parameters, variables, policies, algorithms, instructions, settings, or rules for enabling or preventing cross-perimeter access. For example, the policies 120a may identify a resource external to the perimeter 110a that is accessible by a resource inside the perimeter 110a. A policy of a given perimeter may include or otherwise identify the accessibility of the perimeter generally, the accessibility of specific resource in the perimeter, the ability of resources in the perimeter to access other perimeters, and other accessibility information. A policy may specify accessibility by user, action type, time period, or otherwise. In some implementations, a policy may identify specific resources of a perimeter that are accessible to external resources. For example, the policies 120a for the perimeter 110a may indicate that a specific application in another perimeter 110b may or may not access the data or resources in the first perimeter 110a. As another example, the policies 120a for the perimeter 110a may indicate that any of the applications in the other perimeters 110b or 110c may or may not access the data or resources in the first perimeter 110a.

In some implementations, a policy 120 may define or otherwise identify a process for user authentication. For example, the policies 120 may identify the type and content of user authentication (e.g., password strength, lifecycle) to apply to a cross-perimeter request. When a user requests access to multiple perimeters, the request may be evaluated by the policies of both perimeters. In various examples, if both policies grant access, then the cross-perimeter request may be granted. The policies may identify or include information to determine which network access resources can be used by an external resource in a different perimeter.

An administrator of a perimeter may determine which resources of the perimeter can be accessed by other perimeters. For example, a personal perimeter can be managed by the device user, and an enterprise perimeter can be managed by a corporate administrator. The user's personal applications in the personal perimeter can use network resources in the personal perimeter. The user can also choose whether the personal applications can use an enterprise network. For example, due to privacy concerns, a user may not want his or her web browsing information to traverse a corporate network.

In various examples, an enterprise administrator can set rules on what perimeters (at a macro level) or what applications (at a micro level) can use the enterprise networks. For example, due to security concerns, an enterprise administrator may not want a user-installed application (malware or otherwise) to be able to access on-enterprise network resources. But the administrator may trust certain applications (e.g., applications provided by a particular software provider, or applications having certain security features) and allow those applications to access the enterprise network.

A single device may be configured to allow concurrent use for both personal and work purposes, while keeping personal and work traffic separate. Such use can be provided in a convenient manner that requires no user intervention after the initial setup. In some implementations, users can access the Internet through non-corporate networks for personal use without being subject to restrictions imposed by their employer, and without having their traffic subject to being monitored or scrutinized by their employer. Users may also access the Internet or other network resources through corporate networks for work purposes. The device may be configured to ensure enterprise control over the work traffic, and the user can be given control over whether personal traffic is allowed to flow on corporate networks.

A user control can permit the user to either allow or disallow the user's personal traffic on the corporate network. In cases where an employer has decided to allow personal traffic to flow on corporate networks, the user may wish to avoid those networks so that their personal traffic is not subject to employer restrictions or employer inspection. For example, an employer may restrict access to particular websites, or employees may fear that their employer will scrutinize the websites they visit. As such, personal traffic can be segregated from work traffic on the device, and the user can choose whether personal traffic can be sent over the corporate network. In some cases, personal traffic is sent over a personal network while corporate traffic is sent over a corporate network. This solution can provide added convenience and privacy for the user, and greater flexibility on devices that are used for both business and personal purposes.

In various examples, each network is associated with one or more perimeters. For example, the perimeter 110a can be an enterprise perimeter, and the network access resources 114a can provide access to the enterprise network 104a; the perimeter 110b can be a personal perimeter, and the network access resources 114b can provide access to the other networks 104b. As such, all of the applications 116a in the first perimeter 110a can access the enterprise network resources, and all of the applications 116b in the second perimeter 110b can access the other network resources.

Aspects of the present disclosure, including systems and/or methods according to the present disclosure, may provide a way to set the security type of the device 102 in a way that may not be easily changed (also referred to as a "semi-permanent" setting). For example, the security type may be hard coded in a tamper-proof non-volatile memory of the device, for example as a one-byte security type byte 260 in the non-volatile random access memory (NVRAM) 246 of the device 102. The security type may be set at the manufacturer, prior to initial use of the device 102, or may be set at the first use of the device 102 (e.g., at first registration of the device 102 onto a network 104). The security type byte 260 may be later changed or reset only by authorized personnel and/or only with direct access to the NVRAM 246, for example at a manufacturer or an enterprise repair facility, or according to authorized procedures (e.g., at initial registration, for example as described below).

In the present disclosure the security type of a device may relate to permission granted to different entities to allow incursion into and/or control of various aspects (e.g., different perimeter resources) of the device 102. Different security types may allow for some devices 102 to be more secure at the expense of the user's privacy, while other devices 102 may be more private at the expense of device security, for example.

For example, a device 102 with a "corporate-liable" security type (also referred to as a corporate-liable device) may be subjected to some implementation of one or more security policies (e.g., as set by a corporate administrator 108), which policy(ies) may impact resources associated with a personal perimeter 110a (or otherwise designated as personal) defined in the device 102. A device 102 with a "personal-liable" security type (also referred to as a personal-liable device) may not be subjected to any security policy(ies) that may impact resources associated with the personal perimeter 110a (or otherwise designated as personal). A device 102 with a "regulated" security type (also referred to a regulated device) may be subjected to unlimited implementation of security policy (ies).

A regulated device may be desirable for use in regulated environments, such as government and financial institutions. A regulated device may be a special subset of corporate-liable devices. There may be different purchase prices and/or requirements for obtaining a regulated device.

Security policies that impact resources associated with the personal perimeter 110a of a device 102 may include policies that control a user's access to the device 102 and/or resources (e.g., one or more applications and/or files) stored on the device 102, and/or may compromise the user's privacy on the device 102 (e.g., may allow a corporate administrator 108 to monitor activity on the device 102 without the user's knowledge), particularly with respect to resources designated as personal (e.g., resources associated with the personal perimeter 110a). Such security policies that intrude on a user's personal perimeter 110a may be considered intrusive policies.

Examples of security policies and how devices with different security types may be subject to such policies are shown in the table below:

| Security policy | Applies to: | | |
| --- | --- | --- | --- |
| | Personal-liable device | Corporate-liable device | Regulated device |
| Whole-device password | No | Yes | Yes |
| Whole-device encryption | No | Yes | Yes |
| Whole-device wipe | No | Yes | Yes |
| Work access to personal data | No | No | Yes |
| Email audit trail allowed | No | No | Yes |
| Messaging audit trail allowed | No | No | Yes |

A "whole-device password" security policy may require access to all resources of the device 102 (including both resources designated as personal as well as other resources) to be password-protected. A "whole-device encryption" security policy may require that all communications to and from the device 102 (including communications to and from resources designated as personal) be securely encrypted (e.g., at least over an enterprise network 104a). A "whole-device wipe" security policy may allow all memory (e.g., including flash memory 244, NVRAM 246, ROM 248 and any other memory) of the device 102 to be remotely erased (e.g., by an administrator 108). A "work access to personal data" security policy may allow a corporate administrator 108 access to resources associated with a personal perimeter 110a (e.g., with or without the user's permission). An "email audit trail allowed" security policy may require all email communications to and from the device 102 to be recorded and stored (e.g., in an internal or external memory of the device 102, or on a remote server) as an audit trail. A "messaging audit trail allowed" security policy may require all messaging communications (e.g., including instant messaging, SMS messaging and text messaging communications) to and from the device 102 to be recorded and stored (e.g., in an internal or external memory of the device 102, or on a remote server) as an audit trail.

With respect to creation of email or messaging audit trails, any emails, instant messages or other communications generated from within a personal perimeter 110a (e.g., generated by an application 116a associated with a personal perimeter 110a and sent through a public network 104b) may not be captured automatically by the enterprise network 104a. In such cases, the "email audit trail allowed" and "messaging audit trail allowed" security policies may require the device 102 to automatically make a copy of such communications and store the audit trail in a memory of the device 102. This audit trail may be automatically uploaded to an enterprise data server, such as at the next instance the device 102 accesses the enterprise network 104a, at regular intervals and/or in response to a request from the data server. Appropriate communication applications within the device 102 and/or within the data server may provide one or more functions for carrying this out. For communications that are administrated through a communication server, such as in the case of messaging communications, audit trails may be created on the device 102 and/or in communication server(s) of the network, however creating such records on the device 102 may be more secure and/or simple. The creation of such audit trails may be done to satisfy legal requirements.

In the example illustrated in the above table, none of the security policies may apply to personal-liable devices, some of the security policies may apply to corporate-liable devices, and all of the security policies may apply to regulated devices.

The security policies may be applied to the device 102 in addition to and independently of any perimeter policies 120. For example, a personal-liable device used in a corporate environment may be limited in its access of an enterprise network 104a, due to a perimeter policy 120b, even if the corporate security policy(ies) do not apply to the personal-liable device. However, the personal-liable device may, through application(s) 116a associated with the personal perimeter 110a, access a public network 104b. In some examples, even for regulated devices, the device 102 may still maintain a personal perimeter 110a with full control over downloading of applications 116a and allowing internet browsing in privacy, if the device 102 is not using an enterprise network 104a (e.g., an enterprise virtual private network (VPN)).

The security type byte 260 may be hard-coded in a non-volatile memory, such as the NVRAM 246, of the device 102, and may be protected from tampering (e.g., may not be changeable by any application executed by the processor of the device 102). For example, the security type byte 260 may reside in the operating system 223 and the operating system 223 may prevent unauthorized changing of the security type byte 260. The security type of the device may be changed only upon initial registration of the device 102 (e.g., as described further below), at the manufacturer or at a repair facility (e.g., using specialized authorized software), for example.

For example, in order to change the security type byte 260, specialized software (e.g., available only to the manufacturer) may be required to first enable changing of the security type byte 260 (e.g., by setting a permission field or flag, such as setting a "Security type changeable" field to a "Yes" value; or setting a "Device class permanent" field to a "No" value; in some examples, the factory setting of the device 102 may set such flags or fields to a value that enables changing of the security type byte 260). This may allow other specialized software (e.g., at the manufacturer, repair facility or other authorized entity) to change the value of the security type byte 260. This may protect the security type byte 260 from being directly changed by corporations, administrators or other applications. A corporation may be restricted to being able to change the security type byte 260 value from a "personal-liable" setting (which may be the factory default) to a "corporate-liable" value by establishing a connection between the device 102 and an enterprise server, for example as described further below.

For example, the security type byte 260 may be set with a value to designate the device 102 to be personal-liable, corporate-liable or regulated, as follows:

0=personal-liable
1=corporate-liable
2=regulated

The security type byte 260 may be set to designate a personal-liable security type by default at the manufacturer (e.g., the security type is 0 by default).

Figure 3:
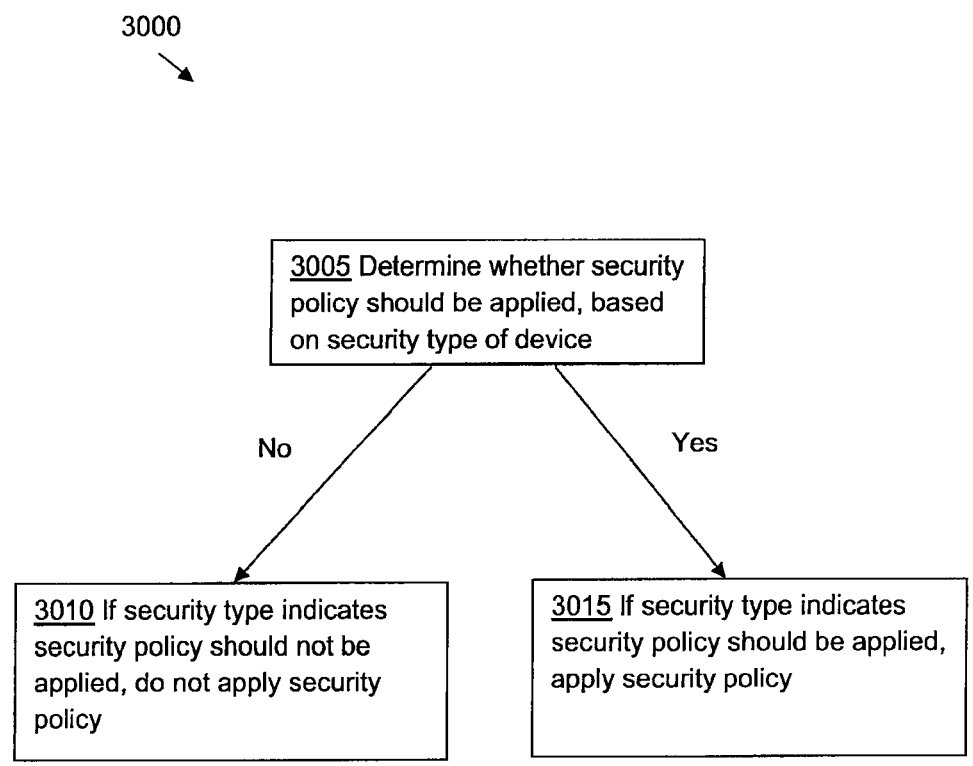
FIG. 3 is a flowchart illustrating an example method for applying a security policy to a wireless device.

FIG. 3 illustrates an example method 3000 for applying a security policy to a device 102, according to the security type of the device 102. The method 3000 may be carried out by the device 102 having a security type set in the security type byte 260 in its non-volatile memory (e.g., NVRAM 246).

At 3005, the device 102 determines whether a received security policy (e.g., received from an administrator, via the network 104) should be in effect (e.g., applied to personal resources). The security policy may govern behavior of one or more resources designated as personal (e.g., one or more resources associated with the personal perimeter 110a). This determination may be based on the security type of the device 102. The security type of the device 102 may be determined (e.g., by the device 102 itself) based on the value of the security type byte 260. For example, the processor 240 may query or otherwise determine the value of the security type byte 260 (e.g., via a query function of the operating system 223). 3005 may take place in response to or after the device 102 receives a new or updated security policy (e.g., via the network 104).

At 3010, the security type is determined to indicate that the received security policy should not be applied. The policy is accordingly not applied. For example, where the security type is determined to be personal-liable (e.g., the security type byte 260 has a value of 0), this may indicate that a received security policy that governs behavior of personal resource(s) (e.g., resource(s) associated with the personal perimeter 110a) should not be applied. In another example, where the security type is determined to be corporate-liable (e.g., the security type byte 260 has a value of 1), this may indicate that the particular received security policy governing behavior of personal resource(s) (e.g., an audit trail creation policy) should not be applied, even though other security policies may be applied.

A signal may be generated (e.g., by the processor 240) to indicate that the received security policy was not applied. For example, an output may be generated on the display 204 to inform the user that the security policy has been rejected (e.g., including identification of the particular security policy rejected). Additionally or in alternative, a signal may be transmitted to the administrator (e.g., via the network 104) to inform the administrator that the security policy has been rejected (e.g., including identification of the particular security policy rejected and/or the device 102 that rejected the policy).

In some examples, the policy may not be applied to resource(s) designated as personal, but may still be applied to other resource(s) not designated as personal. For example, if the received security policy is a "whole-device wipe" policy, the device 102 may determine that this policy should not be applied to personal resource(s), such that personal resource(s) are not erased, however this policy may be applied to other resource(s), such that resource(s) not designated as personal (e.g., resource(s) associated with a corporate perimeter or not associated with any perimeter) may be erased.

At 3015, the security type is determined to indicate that the received security policy should be applied. The policy is accordingly applied. For example, where the security type is determined to be corporate-liable (e.g., the security type byte 260 has a value of 1), this may indicate that a particular received security policy that governs behavior of personal resource(s) (e.g., resource(s) associated with the personal perimeter 110a) should be applied, even though other security policies may not be applied. In another example, where the security type is determined to be regulated (e.g., the security type byte 260 has a value of 2), this may indicate that all received security policies governing behavior of personal resource(s) (e.g., an audit trail creation policy) should be applied.

A signal may be generated (e.g., by the processor 240) to indicate that the received security policy was applied. For example, an output may be generated on the display 204 to inform the user that the security policy has been applied (e.g., including identification of the particular security policy applied). Additionally or in alternative, a signal may be transmitted to the administrator (e.g., via the network 104) to inform the administrator that the security policy has been applied (e.g., including identification of the particular security policy applied and/or the device 102 the policy was applied to).

The method 3000 may then end.

As explained above, the security type of the device 102 may be settable only under particular controlled scenarios, such as by the manufacturer (e.g., at initial manufacture or refurbishing of the device 102) or at a repair facility (e.g., at refurbishing of the device 102) using specialized software able to directly access and change the security type byte 260; or at initial registration of the device 102.

Figure 4:
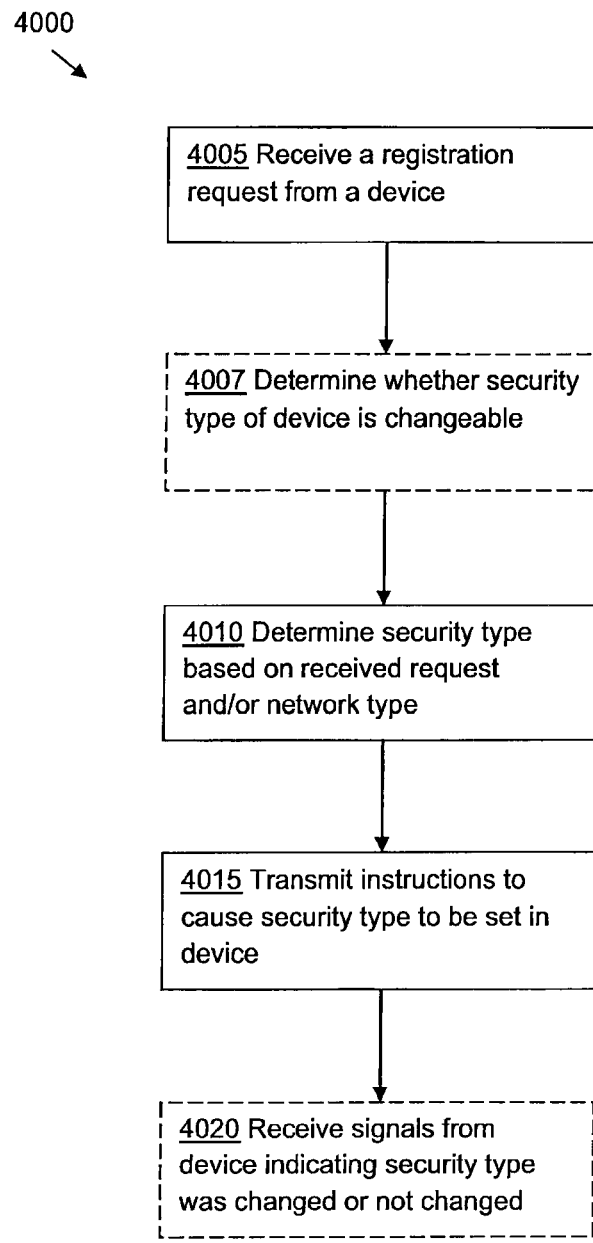
FIG. 4 is a flowchart illustrating an example method for changing a security type of a wireless device, which may be implemented at a server.

FIG. 4 illustrates an example method 4000 for setting the security type of the device 102 (e.g., typically at an initial registration of the device 102). The method 4000 may be carried out by a server of the network 104 (e.g., an enterprise server of the enterprise network 104a).

At 4005, a request for registration of the device 102 on the network 104 may be received (e.g., by the server, which may be an enterprise server).

Optionally at 4007, it may be determined whether the security type of the device 102 is changeable.

For example, the security type of the device 102 may be changeable only at a first-time registration, and it may be determined that a received request for registration of the device 102 on the network 104 is a request for a first-time registration of the device 102. A first-time registration may be the first time the device 102 attempts to register on the network 104 after the device 102 is manufactured, refurbished, or upgraded (e.g., with a new operating system 223) to support device type designation. A server may determine that the received request is a request for first-time registration by determining that the device 102 (e.g., as identified by a unique device identifier) does not appear in a registration list stored by the server, for example. Such a determination may be made to ensure that the security type of the device 102 is only changed at an initial registration.

In some examples, the server may not make any determination whether the request for registration is a first-time registration request. Instead, the server may query the device 102 (e.g., query a permission flag or field stored on the device 102, such as a "Security type changeable" field), to determine whether the security type of the device 102 may be changed.

In some examples, if is it determined that the security type of the device 102 is not changeable (e.g., the registration request is not a first-time registration request, or that a permission field or flag in the device 102 has been set to indicate that the security type is not changeable), the method 4000 may end.

In some examples, the server may not make any determination whether or not the security type is changeable (e.g., 4007 is omitted). Instead, the server may simply attempt to change the security type of the device 102 regardless, and the device 102 itself may determine whether such a change should be allowed (e.g., as described in below).

At 4010, a security type of the device 102 is determined, for example using the received request and/or the type of the network 104. For example, where the network 104 is an enterprise network 104a, the server may determine that the registration request has been received on an enterprise network 104a and may determine that the security type should indicate that one or more security policies governing personal resource(s) may be applied to the device 102 (e.g., the security type may be corporate-liable).

In some examples, where the network 104 is a public network, the server may determined that the registration request has been received on a public network and may determine that the security type should indicate that no security policies governing personal resource(s) may be applied to the device 102 (e.g., the security type may be personal-liable). In other examples, where the network 104 is a public network, there may be no determination made for the security type, and the device 102 may remain with its default security type (e.g., a default security type of personal-liable).

In some examples, information contained in the registration request (e.g., an upgrade key such as a regulated upgrade key) may also be used to determine the security type of the device 102. For example, where the registration request includes an upgrade key (e.g., which may be purchased by the user and provided by the manufacturer), the server may determine that the security type should indicate that all security policies governing personal resource(s) may be applied to the device 102 (e.g., the security type may be regulated). An upgrade key may be an enterprise-specific regulated upgrade key such as a software key issued (e.g., from a manufacturer) to a corporation for use in the corporation's own enterprise servers. Such keys may be purchased by the corporation and may be only issued to authorized parties.

At 4015, instructions may be transmitted (e.g., by the server) to the device 102 to cause the determined security type to be hard-coded in a non-volatile memory (e.g., in the security type byte 260 of the NVRAM 246) of the device 102. For example, the instructions may be specialized code that may cause the operating system 223 of the device 102 to change the security type byte 260 to a value indicating the new security type. This may be a one-time instruction (e.g., at least until the device 102 is refurbished).

In some examples, such as where the server does not make any determination whether the security type of the device 102 is changeable, the instructions to change the security type byte 260 may be transmitted each time the device 102 requests registration with the server (e.g., even if it is not a first-time registration of the device 102). In such cases, the device 102 may execute instructions to prevent improper changing of its security type. For example, upon receiving instructions (e.g., from a server) to change the value of the security type byte 260, the device 102 may query a "Security type changeable" field to determine whether the security type byte 260 should be changed. If the "Security type changeable" field has a value of "Yes", this may indicate that the security type byte 260 may be changed and the device 102 may implement the instructions from the server to change the security type byte 260. The "Security type changeable" field may be then changed to a value of "No", to prevent further changes to the security type byte 260. If the "Security type changeable" field has a value of "No", this may indicate that the security type byte 260 may not be changed and the device 102 may not implement the instructions from the server.

In some examples, instructions to change the security type to "regulated" may be implemented for corporate-liable devices even where the "Security type changeable" field has a value of "No". That is, for corporate-liable devices, instructions to upgrade the security type to a regulated device may override any permission fields or flags preventing a security type change. However, such override may not be permitted for personal-liable devices.

In some examples, the device 102 may generate an output (e.g., a notification on its display 204) indicating to the user the new security type of the device.

Optionally, at 4020, the device 102 may transmit signals to the server to indicate to the server that the security type of the device 102 has been changed (e.g., where the instructions from the server have been implemented) or that the security type of the device 102 has not been changed (e.g., where the instructions from the server have been rejected).

After changing its security type, the device 102 may then set a permission field or flag (e.g., a "Security type changeable" field or "Device class permanent" flag) to indicate that further changes to its security type is not permitted.

Where the security type of the device 102 has been changed to a higher security (e.g., to a corporate-liable device class or a regulated device class), the server may store information about the device 102 (e.g., a unique device identifier) in a list maintained by the server. For example, the server may maintain a list of all regulated devices, in order to better track and/or manage regulated devices.

In some examples, in order for a device 102 to be properly set as a corporate-liable device, it may be necessary to ensure that the initial registration of the device 102 take place over the enterprise network 104a. Similarly, in order for a device 102 to retain its default setting as a personal-liable device, it may be necessary to ensure that the initial registration of the device 102 takes place over a public network. The security type of the device 102 may thus be determined by which network 104 the device 102 initially registers with.

The method 4000 may be implemented with little or no changes to conventional registration software of the server. Where an upgrade key is included in the registration request, the server may be provided with additional software to identify such information. The server may also include a database for storing identification of devices of a certain security type (in particular regulated devices) and/or may include software for specialized billing based on the security type (in particular specialized billing for regulated devices).

Figure 5:
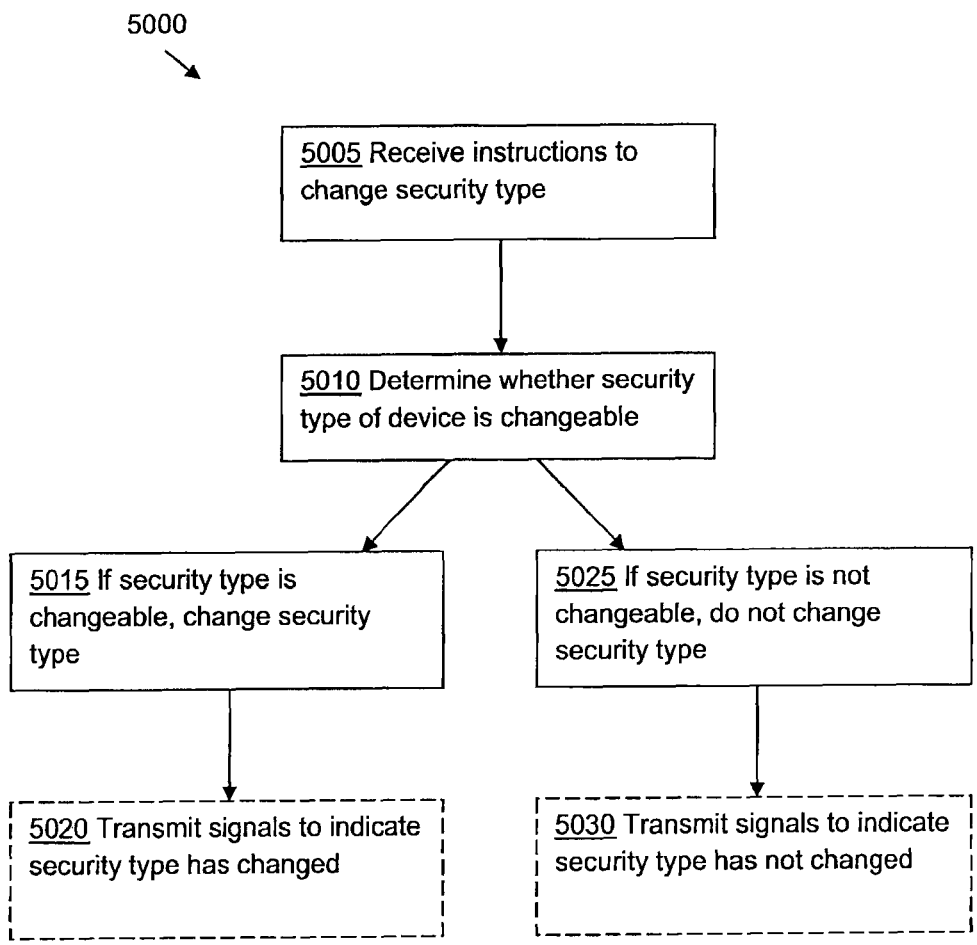
FIG. 5 is a flowchart illustrating an example method for changing a security type of a wireless device, which may be implemented at the device.

FIG. 5 illustrates an example method 5000 for setting the security type of the device 102. The method 5000 may be carried out by the device 102, and may be carried out in conjunction with the method 4000.

At 5005, the device 102 may receive instructions (e.g., from a server of the network 104, such as an enterprise server of the enterprise network 104a) to change the security type of the device 102.

At 5010, the device 102 may determine whether the security type is changeable. This determination may be based on the security type of the device 102, a permission flag of the device 102 and/or the instructed security type change. For example, the device 102 may query a permission field or flag (e.g., a "Security type changeable" field or "Device class permanent"), which may be maintained by the operating system 223, to determine whether the security type is changeable. In addition, the device 102 may query its own security type (e.g., by querying the value of the security type byte 260).

At 5015, if it has been determined that the security type is changeable (e.g., "Security type changeable" field has a value of "Yes" or "Device class permanent" flag has a value of "No"; or the device 102 is instructed to change to regulated security type and the device 102 is a corporate-liable device), the security type of the device 102 may be changed in accordance with the received instructions (e.g., the security type byte 260 value may be set in accordance with the received instructions).

Optionally, at 5020, the device 102 may transmit signals (e.g., to the server and/or for output to a user via one or more output devices) to indicate that the security type has been changed (and optionally what the new security type is).

At 5025, if it has been determined that the security type is not changeable (e.g., "Security type changeable" field has a value of "No" or "Device class permanent" flag has a value of "Yes"), the security type of the device 102 may not be changed (e.g., the security type byte 260 value may remain unchanged).

Optionally, at 5030, the device 102 may transmit signals (e.g., to the server and/or for output to a user via one or more output devices) to indicate that the security type has not been changed (and optionally what the unchanged security type is).

An example operation of the method 4000 and/or the method 5000 is described below.

The factory default setting of the device 102 may set the security type byte 260 to indicate a personal-liable device (e.g., security type byte 260 may have a value of "0") and may set the "Security type changeable" field to indicate that the security type is changeable (e.g., "Security type changeable" field may have a value of "Yes" or similarly a "Device class permanent" flag may be set to "No").

Upon initial registration of the device 102 with the network 104 via a public server, the "Security type changeable" field may be set to "No" (or similarly a "Device class permanent" flag may be set to "Yes"), while the security type may be unchanged. The device 102 may thus be set to be personal-liable, and any subsequent attempt to change the security type of the device 102 may be rejected by the device 102. This may prevent a personal-liable device 102 from erroneous or unauthorized attempts to convert the device 102 to a corporate-liable or regulated device, for example.

Alternatively, the device 102 may instead initially register with an enterprise network 104a via an enterprise server. Since the device 102 still has a "Security type changeable" value of "Yes" (that is, the factory settings have not yet been changed), it may be possible for the enterprise server to change the security type of the device 102. The security type of the device may be set to corporate-liable or regulated (e.g., according to the method 4000 described above). The device may then set the "Security type changeable" field to a value of "No".

In some examples, instructions to change the security type of the device 102 to regulated may override the "Security type changeable" field, only where the device 102 has a security type of corporate-liable. For example, even where the "Security type changeable" field has a value of "No", a corporate-liable device may still be upgraded to a regulated device. In other examples, when the security type of the device is set to corporate-liable, the "Security type changeable" field may remain with a value of "Yes", to enable further upgrade to a regulated device.

The following table illustrates example scenarios of how the security type of the device 102 may be set by the server:

| Instructions from server to set security type to: | Device has security type setting of: | Device has "Security type changeable" value of: | Device implements security type change? | Subsequent security type of device: |
|---|---|---|---|---|
| Corporate-liable | Personal-liable | Yes | Yes | Corporate-liable |
|  |  | No | No | Personal-liable |
| Regulated | Personal-liable | Yes | Yes | Regulated |
|  |  | No | No | Personal-liable |
|  | Corporate-liable | Yes | Yes | Regulated |
|  |  | No | Yes | Regulated |

In some examples, the restrictions illustrated in the table above may all be overridden only by an authorized entity, such as the manufacturer or a repair facility (e.g., using specialized software and/or using specialized code).

The disclosed methods and systems may provide one or more of the following advantages.

The same device model (e.g., using a single part number) may be used for devices with different security types. An upgrade to a more secure device (e.g., a regulated device) may be available at request (e.g., with payment of an upgrade charge), and only when needed. Thus, inventory management, and associated costs, may be decreased. This may also allow for more flexibility in inventory. For example, devices may be set to be personal-liable, corporate-liable or regulated relatively quickly and easily, in response to market needs. Pricing for different security types may also be adjusted (e.g., based on purchased volume of a certain security type)

A corporate-liable device may be upgraded to a regulated device any time, for example by including the regulated upgrade key in the registration procedure (e.g., as described above). This may provide a relatively simple upgrade process to enable corporations to upgrade corporate-liable devices to regulated devices, without having to recall currently-used devices and reissue new devices to its employees.

A database of all devices of a particular security type (e.g., all regulated devices) may be maintained and updated as needed. This may help to increase the security and/or traceability of such devices.

A corporate-liable or regulated device may be reset back to a personal-liable device (e.g., the default setting) when a device is returned to the manufacturer or to a repair facility (e.g., for refurbishing). This resetting may include deregistering the device from the infrastructure. Thus, after refurbishing, the next registration of the device on a network will be considered as an initial registration of the device. After resetting, the device may be re-circulated into the market as a new device and may be re-registered with a security type, for example as described above.

While the present disclosure refers to certain security types governing applicability of certain security policies, these are only illustrative. The specified security types may govern applicability of security policies in a different way and/or may govern applicability of different security policies. There may be different security types designated. Although the security type has been described as being hard-coded in a single byte of the non-volatile memory, the security type may be hard-coded in other ways, provided the security type is protected from tampering (e.g., unchangeable using an application executed by the device itself).

The embodiments of the present disclosure described above are intended to be examples only. Alterations, modifications and variations to the disclosure may be made without departing from the intended scope of the present disclosure. In particular, selected features from one or more of the above-described embodiments may be combined to create alternative embodiments not explicitly described. All values and sub-ranges within disclosed ranges are also disclosed. The subject matter described herein intends to cover and embrace all suitable changes in technology. All references mentioned are hereby incorporated by reference in their entirety.

The invention claimed is:

1. A wireless device comprising:
   a non-volatile memory comprising a designation of a security type hard-coded in the non-volatile memory; and
   a processor coupled to the non-volatile memory, the processor being configured to execute computer-readable instructions to cause the wireless device to:
      determine, based on the security type, whether a received security policy governing behavior of one or more resources designated as personal is applicable to the one or more resources designated as personal;
      if the security type is determined to indicate that the received security policy is not applicable to the one or more resources designated as personal, not apply the security policy to the one or more resources designated as personal; and
      if the security type is determined to indicate that the received security policy is applicable to the one or more resources designated as personal, apply the security policy to the one or more resources designated as personal,
   wherein the wireless device is configurable to provide concurrent use for both personal and work purposes and the security type is one of the following:
      a first security type, which indicates that no security policies are applicable to resources designated as personal;
      a second security type, which indicates that at least one security policy is applicable to resources designated as personal; or
      a third security type, which indicates that all security policies are applicable to resources designated as personal.

2. The device of claim 1 wherein the processor is further configured to execute computer-readable instructions to cause the device to, if the security type is determined to indicate that the received security policy is not applicable to the one or more resources designated as personal, apply the security policy only to any resources not designated as personal.

3. The device of claim 1 wherein the security policy comprises at least one of:
   a whole-device password policy;
   a whole-device encryption policy;
   a whole-device wipe policy;
   a personal data access policy;
   an email audit trail creation policy; or
   a messaging audit trail creation policy.

4. The device of claim 1 wherein the security type is not changeable by any application executed by the processor.

5. The device of claim 1 wherein the security type is hard-coded in a byte of the non-volatile memory.

6. The device of claim 1, wherein the first security type is personal-liable, the second security type is corporate-liable and the third security type is regulated.

7. A method for applying a security policy to a wireless device, wherein the method is carried out by the wireless device comprising a security type hard-coded in a non-volatile memory, the method comprising:
   determining, using a processor coupled to the non-volatile memory, based on the security type hard-coded in a non-volatile memory, whether a received security policy governing behavior of one or more resources designated as personal is applicable to the one or more resources designated as personal;
   if the security type is determined to indicate that the received security policy is not applicable to the one or more resources designated as personal, not applying the security policy to the one or more resources designated as personal; and
   if the security type is determined to indicate that the received security policy is applicable to the one or more resources designated as personal, applying the security policy to the one or more resources designated as personal,
   wherein the wireless device is configurable to provide concurrent use for both personal and work purposes and the security type is one of the following:
      a first security type, which indicates that no security policies are applicable to resources designated as personal;
      a second security type, which indicates that at least one security policy is applicable to resources designated as personal; or
      a third security type, which indicates that all security policies are applicable to resources designated as personal.

8. The method of claim 7 further comprising if the security type is determined to indicate that the received security policy is not applicable to the one or more resources designated as personal, applying the security policy only to any resources not designated as personal.

9. The method of claim 7 wherein the security policy comprises at least one of:
   a whole-device password policy;
   a whole-device encryption policy;
   a whole-device wipe policy;
   a personal data access policy;
   an email audit trail creation policy; or
   a messaging audit trail creation policy.

10. The method of claim 7 wherein the security type is not changeable by any application executed by the processor.

11. The method of claim 7 wherein the security type is hard-coded in a byte of the non-volatile memory.

12. The method of claim 7, wherein the first security type is personal-liable, the second security type is corporate-liable and the third security type is regulated.

13. A non-transitory computer readable medium comprising computer readable-instructions which, when executed by one or more processors of a wireless device, cause the one or more processors to be configured to:
   determine, using a processor coupled to the non-volatile memory, based on the security type hard-coded in a non-volatile memory, whether a received security policy governing behavior of one or more resources designated as personal is applicable to the one or more resources designated as personal;
   if the security type is determined to indicate that the received security policy is not applicable to the one or more resources designated as personal, not apply the security policy to the one or more resources designated as personal; and
   if the security type is determined to indicate that the received security policy is applicable to the one or more resources designated as personal, apply the security policy to the one or more resources designated as personal,
   wherein the wireless device is configurable to provide concurrent use for both personal and work purposes and the security type is one of the following:

a first security type, which indicates that no security policies are applicable to resources designated as personal;

a second security type, which indicates that at least one security policy is applicable to resources designated as personal; or a third security type, which indicates that all security policies are applicable to resources designated as personal.

14. The computer readable medium of claim 13 wherein the computer readable instructions are further configured to, if the security type is determined to indicate that the received security policy is not applicable to the one or more resources designated as personal, apply the security policy only to any resources not designated as personal.

15. The computer readable medium of claim 13 wherein the security policy comprises at least one of:
a whole-device password policy;
a whole-device encryption policy;
a whole-device wipe policy;
a personal data access policy;
an email audit trail creation policy; or
a messaging audit trail creation policy.

16. The computer readable medium of claim 13 wherein the security type is not changeable by any application executed by the processor.

17. The computer readable medium of claim 13 wherein the security type is hard-coded in a byte of the non-volatile memory.

18. The computer readable medium of claim 13, wherein the first security type is personal-liable, the second security type is corporate-liable and the third security type is regulated.

* * * * *